US011060596B2

(12) United States Patent
Hain et al.

(10) Patent No.: US 11,060,596 B2
(45) Date of Patent: Jul. 13, 2021

(54) FLEXIBLE TRANSMISSION COMPONENT

(71) Applicant: SCHAEFFLER TECHNOLOGIES AG & CO. KG, Herzogenaurach (DE)

(72) Inventors: Bastian Hain, Creglingen (DE); Peter Zierer, Erlangen (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 168 days.

(21) Appl. No.: 16/349,017

(22) PCT Filed: Nov. 7, 2017

(86) PCT No.: PCT/DE2017/100945
§ 371 (c)(1),
(2) Date: May 10, 2019

(87) PCT Pub. No.: WO2018/095463
PCT Pub. Date: May 31, 2018

(65) Prior Publication Data
US 2019/0264792 A1 Aug. 29, 2019

(30) Foreign Application Priority Data
Nov. 22, 2016 (DE) .......................... 102016222997.4

(51) Int. Cl.
F16H 49/00 (2006.01)

(52) U.S. Cl.
CPC ..... F16H 49/001 (2013.01); F16H 2049/003 (2013.01)

(58) Field of Classification Search
CPC .................. F16H 2049/003; F16H 49/001
See application file for complete search history.

(56) References Cited

U.S. PATENT DOCUMENTS

| 3,091,979 A * | 6/1963 | Jennings ............... F16H 49/001 74/640 |
| 6,050,155 A * | 4/2000 | Tortora ................. F16H 49/001 74/640 |
| 6,065,362 A | 5/2000 | Kiyosawa et al. |
| 2003/0233909 A1* | 12/2003 | Tanioka ............... F16H 49/001 74/640 |
| 2018/0252305 A1* | 9/2018 | Hain ....................... F01L 1/352 |
| 2018/0306299 A1* | 10/2018 | Hain .................... F16H 49/001 |

FOREIGN PATENT DOCUMENTS

| DE | 29901418 U1 | 5/1999 |
| DE | 102004009128 A1 | 9/2005 |
| DE | 102013216183 A1 | 2/2015 |
| DE | 102013220220 A1 | 4/2015 |
| DE | 102014202060 A1 | 8/2015 |

(Continued)

Primary Examiner — Terence Boes
(74) Attorney, Agent, or Firm — Dickinson Wright PLLC

(57) ABSTRACT

A transmission component is described in which a cylindrical section has outer teeth, and a flange extends radially outward relative to the cylindrical section. The flange has a plurality of raised connecting sections that are axially offset from a remainder of the flange. Each connecting section has a hole configured to receive a fastener such as a screw. In certain embodiments, a plurality of recesses are provided radially between the connecting sections and the cylindrical section.

20 Claims, 2 Drawing Sheets

(56) References Cited

FOREIGN PATENT DOCUMENTS

| | | |
|---|---|---|
| DE | 102016207046 A1 | 2/2017 |
| DE | 102016208536 B3 | 6/2017 |
| EP | 0514829 B2 | 6/1999 |
| EP | 0741256 B1 | 11/2000 |
| JP | 09291983 A | 11/1997 |
| WO | 9500748 A1 | 1/1995 |

* cited by examiner

FLEXIBLE TRANSMISSION COMPONENT

CROSS-REFERENCE TO RELATED APPLICATIONS

This application is the U.S. National Phase of PCT/DE2017/100945 filed Nov. 7, 2017, which claims priority to DE 102016222997.4 filed Nov. 22, 2016, the entire disclosures of which are incorporated by reference herein.

TECHNICAL FIELD

The disclosure relates to a flexible transmission component for a harmonic gearing.

BACKGROUND

Such a transmission component is known from EP 0 741 256 B1, for example. This is a malleable gearwheel with an outer toothing, which is located in a harmonic gearing inside a rigid gearwheel with inner toothing. The cylindrical section of the malleable gearwheel with the outer toothing transitions into a flange facing radially outward. The inner region of the flange is referred to as an annular membrane in EP 0 741 256 B1. This membrane transitions to a thicker region, referred to as an annular hub, with a number of bore holes. The annular hub can be attached therewith to an adjacent component.

EP 0 514 829 B2 discloses a flexible transmission component referred to as a flexible cup-element, which exhibits similarities to the flexible gearwheel according to EP 0 741 256 B1 insofar as a membrane and a hub adjoin a cylindrical section of the transmission element with an outer toothing, which extend radially from the transmission element. In EP 0 514 829 B2, the membrane and the hub adjoining it face radially inward, such that the transmission element as a whole forms a cup or well. The transmission elements described in these two documents are intended for use in control gearings for robots.

Harmonic gearings are also used in automotive engineering as high reduction ratio control gearings. Harmonic gearings used as components of electrical camshaft timers are known, for example, from DE 10 2004 009 128 A1, DE 10 2013 220 220 A1, and DE 10 2014 202 060 A1.

SUMMARY

An object of this disclosure is to present a flexible transmission component for a harmonic gearing that has been refined with respect to the prior art, distinguished by a particularly beneficial relationship between the necessary installation space, production effort, and durability.

This object is achieved according to the disclosure by a flexible transmission component disclosed herein. The transmission component has a cylindrical section with an outer toothing, adjoined by a collar, e.g. a flange, in which bore holes are provided. Both a radially outward facing flange as well as a radially inward facing base section are referred to as a collar. In both cases, the bore holes may be located in adjoining sections of the transmission component, which are offset axially in relation to the rest of the flange.

The axial offset of the adjoining sections, which can be attached to an adjacent component, significantly contributes to keeping scope of the mechanical tensions occurring therein within moderation, even when the transmission component is deformed. At the same time, slightly more space is required at most by the axially offset connecting section in comparison with a cap-shaped or cup-shaped transmission component, the flange of which lies in a single plane. If the connecting regions are offset toward the cylindrical section in relation to the remaining region of the flange, this results in a reduction in installation space, because the screw heads bearing on the connecting sections do not extend as far from the flange.

There may be exactly one bore hole in each connecting section of the flange. The head of a screw passing through the bore hole bears only on the connecting section, and not on sections of the flange that are axially offset thereto in the transmission component.

The flexible transmission component can be located on either the input or output side of the transmission, depending on the type of transmission. If the flange faces radially outward, thus giving the transmission component the shape of a hat, it may be a transmission component at the input side. If in contrast, the transmission component is in the shape of a cup, i.e. with a radially inward facing flange, it may be a transmission component at the output side. In both cases the connecting section is raised axially on the surrounding flange far enough that a gap is formed—when viewing the transmission component in the radial direction—between the connecting section and a surrounding section of the flange, bordering on the end surface of the transmission component. As a result, the connecting section is exposed axially, thus increasing the mechanical capacity of the transmission component, as well as limiting tensions thereto. At the same time, pronounced elastic properties of the overall transmission component, including the flange, can be obtained via the axially exposed connecting sections.

The connecting sections can be round or basically rectangular for example. Each connecting section may extend radially outward to the edge of the collar. The connecting sections may be spaced radially apart from the cylindrical section of the transmission component toward the inside.

There are numerous recesses in the annular region of the flange lying in a single plane that is not axially exposed in an advantageous embodiment, wherein each of these recesses may lie radially directly within a connecting section. Each recess may extend beyond the adjoining connecting section on both sides along the circumference of the flange, wherein the recess has a concave curvature, expanding at its ends. The concave curvature of the recess means that it is curved counter to the curvature of the flange. Because of this concave curvature, the expanded ends of the recess can overlap the bore hole in the connecting region in the radial direction of the transmission component. This means that there is at least one circle that is concentric to the central axis of the transmission component, which intersects both the bore hole on the connecting section as well as the ends of the recess with a concave curvature. The transmission component thus has a pronounced flexibility when subjected to angular loads, while exhibiting a high degree of circumferential rigidity.

The transmission component may be a sheet metal part; the wall thickness of the collar, including the connecting sections, is at least nearly uniform. The toothing of the cylindrical section of the transmission component may also be an integral component of the transmission component produced using shaping technologies. In an alternative embodiment, a toothed ring is placed on the cylindrical section as a separate component, and connected thereto for conjoint rotation therewith. The flexible transmission component is particularly suitable for use in a harmonic gearing, which is used as a control gearing for an electrical camshaft timer. The flexible transmission component is also suitable for use in a harmonic gearing in a device for adjusting the compression ratio of a piston engine, in particular a reciprocating piston engine.

DETAILED DESCRIPTION OF THE DRAWINGS

Figure 1:
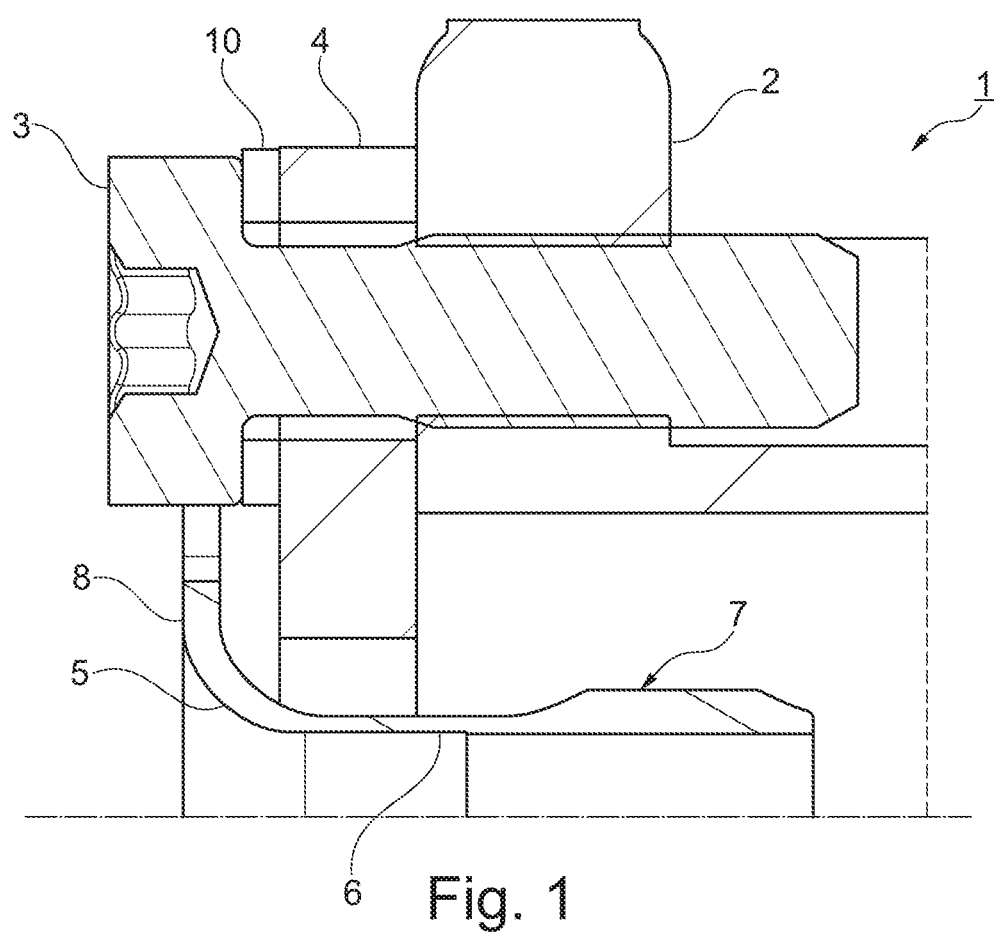
FIG. 1 shows a section of a control gearing, specifically a harmonic gearing, with a flexible transmission component.
Figure 4:
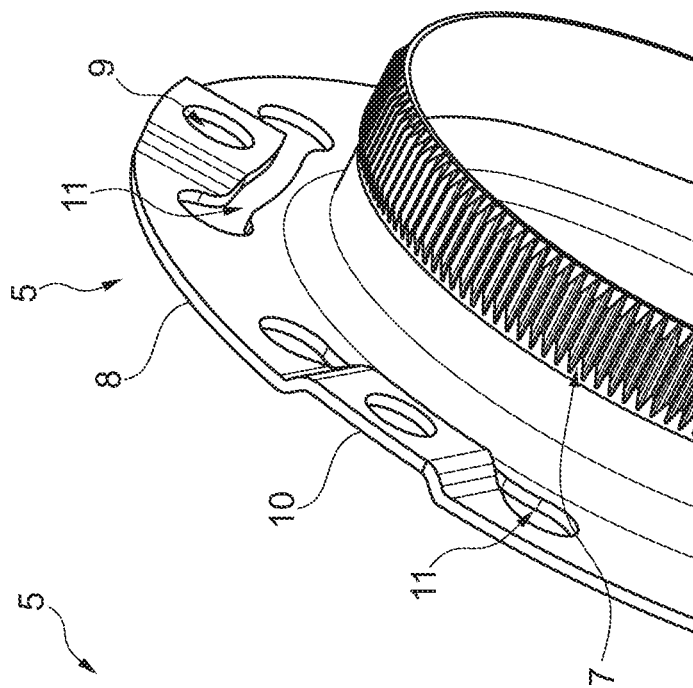
FIG. 4 shows a section of the flexible transmission component in a perspective view.

FIG. 1 shows a schematic view of the harmonic gearing 1, which is used as a control gearing for an electrical camshaft timer. Reference is made to the prior art cited in the introduction with regard to the principle structure and function of the harmonic gearing 1.

A drive element 2 of the harmonic gearing 1 is in the form of a chain wheel, and is powered by the crankshaft of an internal combustion engine, wherein it rotates at half of the rotational rate of the crankshaft. A flexible transmission component 5, specifically a collar sleeve, is connected to the drive element 2 with numerous screws 3, and a disk 4 is attached to the drive element 2, which functions as a stop in the harmonic gearing 1.

The flexible transmission component 5 has a cylindrical section 6 with a toothing 7 on its outer surface, i.e. an outer toothing. The toothing 7 interacts in the known manner with the inner toothing of a rigid transmission element, not shown, wherein the cylindrical section 6, including the toothing 7, becomes deformed by a wave generator when the harmonic gearing 1 is in operation.

At the end surface of the flexible transmission component 5 lying opposite the toothing, the cylindrical section 6 transitions into a radially outward facing flange 8, which is also referred to as a collar.

The collar 8 lies for the most part in a single plane that is perpendicular to the central axis of the flexible transmission component 5, and thus to the rotational axis of the harmonic gearing 1. There are connecting regions 10 rising above this plane, which are evenly distributed over the circumference of the collar 8, and form integral components of the collar 8. There is a bore hole 9 in the middle of each of the five connecting sections 10, through which a screw 3 is inserted, such that the head of the screw 3 is flush with the connecting section.

Figure 3:
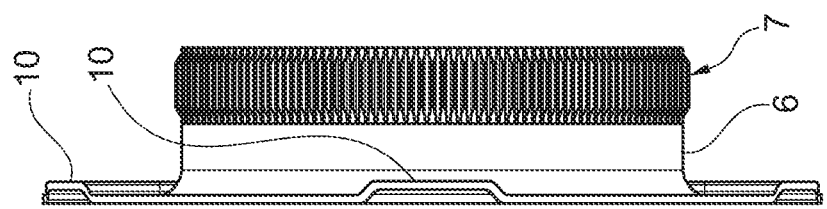
FIG. 3 shows the flexible transmission component in a side view.
Figure 2:
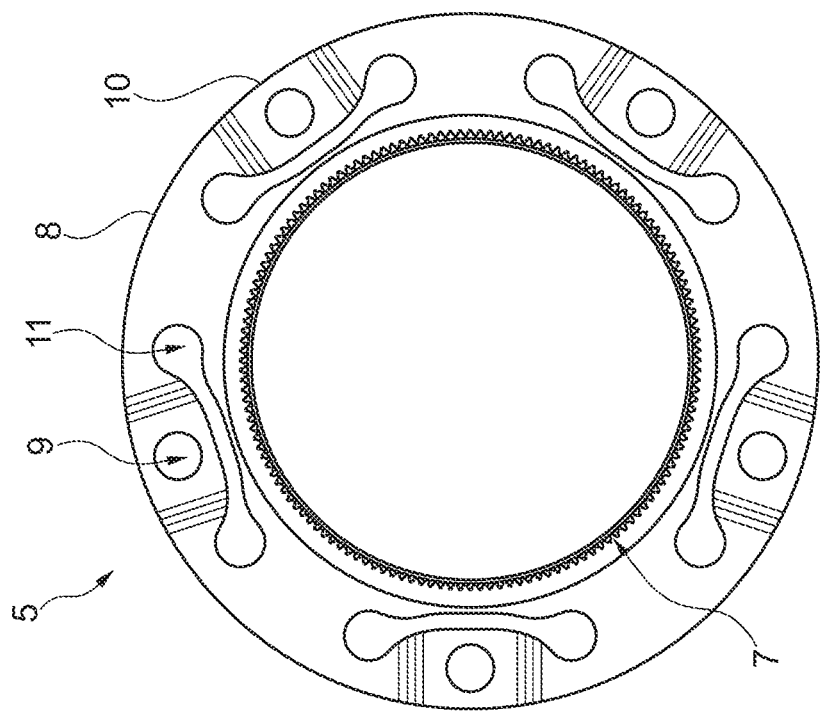
FIG. 2 shows the flexible transmission component in the assembly according to FIG. 1, in a front view.

The connecting sections 10 are raised axially above the remaining annular region of the flange 8, such that they are closer to the toothing 7, as can be seen in particular in the side view (FIG. 3). It can also be derived from this perspective that the offset of the connecting region to the surrounding sections of the collar 8 is greater than its wall thickness. The overall flange 8, including the connecting sections 10, has a uniform wall thickness.

Each connecting section 10 is limited radially inward by a recess 11 formed in the flange 8. The recess 11 extends circumferentially further than the connecting section 10. The shape of each of the connecting sections is basically rectangular, with rounded longitudinal edges, formed by the outer contour of the collar 8 on one side and by the edge of the recess 11 at the other side. Each recess 11 forms an elongated, concave shape with expanded ends, wherein the ends of the recess 11 are located on both sides of the connecting section 10 along the circumference of the flange 8.

LIST OF REFERENCE SYMBOLS 1 harmonic gearing
2 drive element
3 screw
4 disk
5 flexible transmission component, collar sleeve
6 cylindrical section
7 toothing
8 collar, flange
9 bore hole
10 connecting section
11 recess

The invention claimed is:

1. A flexible transmission component that has a cylindrical section with outer toothing, and a flange adjoining the cylindrical section, wherein the flange has a main body and a plurality of protuberances extending from the main body, wherein each protuberance has a respective bore hole therethrough, and wherein each protuberance is located axially offset from adjacent locations of the main body of the flange along a common radius.

2. The transmission component according to claim 1, wherein the protuberances are offset toward the cylindrical section in relation to the main body of the flange.

3. The transmission component according to claim 1, wherein there is exactly one bore hole in each protuberance.

4. The transmission component according to claim 3, wherein a bearing surface for a head of a screw is formed by each protuberance.

5. The transmission component according to claim 1, wherein each protuberance extends radially outward to an edge of the flange.

6. The transmission component according to claim 5, wherein each protuberance is radially spaced apart from the cylindrical section of the flange.

7. The transmission component according to claim 6, further comprising a recess in the flange located between the protuberance and the cylindrical section.

8. The transmission component according to claim 7, wherein the recess extends over the protuberance on both sides along a circumferential direction of the transmission component, exhibits a concave curvature, and is expanded at ends.

9. The transmission component according to claim 1, wherein the transmission component is in a form of a sheet metal part, and the flange exhibits a uniform wall thickness.

10. A transmission component comprising:
a cylindrical section having outer teeth; and
a flange extending radially outward from the cylindrical section, wherein the flange has a main body extending along a first plane, and a plurality of protuberances extending from the main body and along a second plane axially offset from the first plane, wherein each protuberance defines a bore hole, and wherein each protuberance is axially offset from adjacent locations of the main body along a common radius.

11. The transmission component of claim 10, wherein the outer teeth are axially closer to the second plane than the first plane.

12. The transmission component of claim 10, wherein there is exactly one bore hole in each of the protuberances.

13. The transmission component of claim 10, further comprising a plurality of recesses in the flange, each recess located radially between a corresponding one of the bore holes and the outer teeth.

14. The transmission component of claim 13, wherein each recess extends axially through the flange.

15. The transmission component of claim 13, wherein each recess extends at least partially circumferentially around a radially-inward portion of a corresponding one of the protuberances.

16. A transmission component comprising:
a cylindrical section having outer teeth; and
a flange extending radially outward relative to the cylindrical section, the flange having a main body and a plurality of raised protuberances extending from the main body that are axially offset from adjacent locations of the main body of the flange along a common radius, wherein the main body and the protuberances have the same thickness, and wherein each protuberance has a hole.

17. The transmission of claim 16, wherein the outer teeth are axially closer to the protuberances than the main body of the flange.

18. The transmission of claim 16, wherein the flange includes a plurality of recesses, each recess located radially between the cylindrical section and the protuberances.

19. The transmission of claim 18, wherein the recesses are holes extending entirely through the main body of the flange.

20. The transmission component of claim 1, wherein each protuberance has a first side and an opposing second side, the first side being closer to the outer toothing than the second side, and wherein the second side of each protuberance is cup-shaped.

* * * * *